US007262378B2

(12) United States Patent
Adachi et al.

(10) Patent No.: US 7,262,378 B2
(45) Date of Patent: Aug. 28, 2007

(54) COMBINATION SWITCH FOR VEHICLE AND ASSEMBLY METHOD OF SAME

(75) Inventors: Toshiyuki Adachi, Tokyo (JP); Tetsuya Inotsuka, Tokyo (JP)

(73) Assignee: Niles Co., Ltd. (JP)

( * ) Notice: Subject to any disclaimer, the term of this patent is extended or adjusted under 35 U.S.C. 154(b) by 116 days.

(21) Appl. No.: 11/079,368

(22) Filed: Mar. 15, 2005

(65) Prior Publication Data
US 2005/0208800 A1      Sep. 22, 2005

(30) Foreign Application Priority Data
Mar. 17, 2004    (JP)    ............................ P2004-075961

(51) Int. Cl.
*H01H 9/00*    (2006.01)
(52) U.S. Cl. .................. 200/61.54; 200/61.55
(58) Field of Classification Search ............. 200/61.54, 200/5 A, 61.27, 5 R, 61.55, 61.56; 439/15, 439/24, 164
See application file for complete search history.

(56) References Cited

U.S. PATENT DOCUMENTS 6,462,290 B1    10/2002    Matsumoto
6,689,971 B2 *   2/2004    Miyako et al. .......... 200/61.54
6,854,977 B2 *   2/2005    DuRocher et al. ............ 439/15
6,921,872 B2 *   7/2005    Rudolph et al. ......... 200/61.54

FOREIGN PATENT DOCUMENTS

JP    2002-150864    5/2002

* cited by examiner

*Primary Examiner*—Elvin Enad
*Assistant Examiner*—Lisa Klaus
(74) *Attorney, Agent, or Firm*—Rader Fishman & Grauer PLLC; Ronald P. Kananen

(57) ABSTRACT

A combination switch comprising a body 1 mounted in a bracket of a vehicle body side, the body 1 including lever switches on a right side and a left side of the body 1, a bottom cover 3 detachably mounted to the body 1, the bottom cover 3 supporting a flat cable for supplying power from the vehicle body side to a steering wheel side, as well as including a right and a left connector support section 11, 13 corresponding to the lever switches on the right and the left side and a connection cord 5, wherein both ends of connectors 15, 17 are supported to the connector support sections 11, 13 and the connectors 15, 17 are connected to the lever switches by the connection cord 5, is characterized in that a cord engagement section 27 is projected on an outer peripheral section of the bottom cover 1, and the connection cord 5 is engaged to the outer peripheral section of the cord engagement section 27 to be disposed along an outer peripheral side of the bottom cover 3 so as to bypass the bottom cover 3.

12 Claims, 8 Drawing Sheets

COMBINATION SWITCH FOR VEHICLE AND ASSEMBLY METHOD OF SAME

TECHNICAL FIELD

The present invention relates to a combination switch for a vehicle and a method of assembling the same.

BACKGROUND INFORMATION

Figure 11:
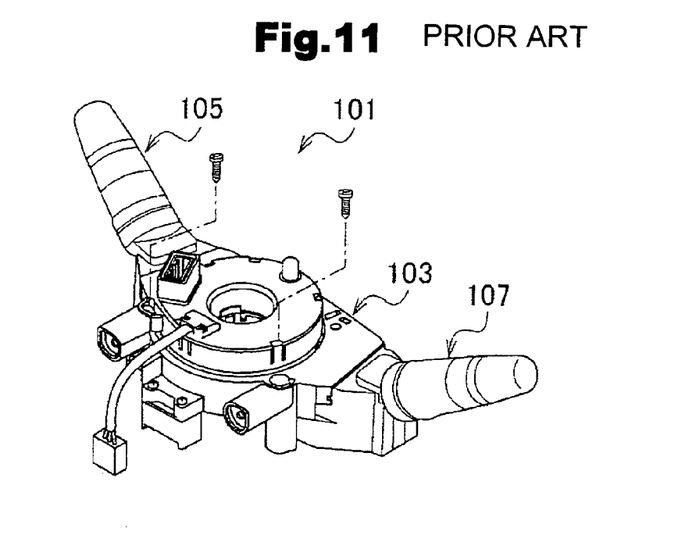
FIG. 11 is a perspective view of a combination switch for a vehicle (conventional example).
Figure 12:
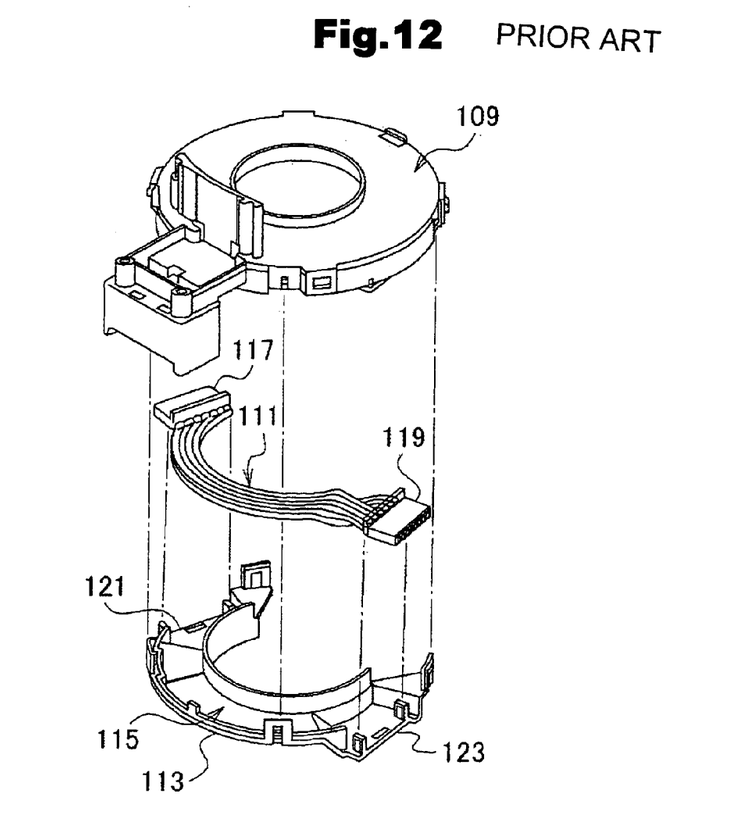
FIG. 12 is an exploded perspective view of a bottom cover, an connection cord, and a cord cover (conventional example).

A conventional combination switch for a vehicle is shown for example, in FIGS. 11 and 12. FIG. 11 is a perspective view of a combination switch for a vehicle and FIG. 12 is an exploded perspective view of a bottom cover, a connection cord, and a cord cover.

As shown in FIG. 11, a combination switch 101 for a vehicle includes a right and a left lever switch mounted in a body 103. A bottom cover 109 is detachably mounted to a lower face of the body 103 in FIG. 12. The bottom cover 109 supports a flat cable received inside the body 103 from the lower face thereof.

A connection cord 111 is disposed in a lower face of the bottom cover 109. The connection cord 111 is received in a receiving space 115 of a cord cover 113 and connectors 117, 119 in both ends are engaged with connector support sections 121, 123 in both ends of the cord cover 113. The cord cover 113 is mounted on a lower face of the bottom cover 109 and the connection cord 111 is disposed on the lower face of the bottom cover 109.

The connectors 117, 119 are connected respectively to sides of lever switches 105, 107. Accordingly action instructions for a wiper and a washer can be performed by an operation of the lever switch 105, and instructions for a turn signal, a passing switch, a main dim switch, and an on/off of a head light and a fog lamp can be made by an operation of the lever switch 107.

However, since in such construction, the connection cord 111 is disposed on the lower face of the bottom cover 109 through the cord cover 113, there is not sufficient space on the lower face of the bottom cover 109, and, as a result, there is an undesired increase in the entire construction size of the combination switch.

And for example, in the case of assembling a slip ring for a heater under the lower face of the bottom cover 109, the slip ring is assembled between the connection cord 111 and lower face of the bottom cover 109. Therefore, the assembly can not be made or is extremely difficult to make.

Further, the connection cord is disposed on the lower face of the bottom cover 109 by receiving the connection cord inside a receiving space 115 of the cord cover 113, and the connection cord 111 is easily loosened on assembly, whereby the loosened cord is sandwiched between the cord cover 113 and the bottom cover 109, which deteriorates the durability of the connection cord 111.

Attention should be paid to prevent the loosened connection cord 111 from being caught in between the bottom cover 109 and the cord cover 113, which causes assembly difficulties. [see Patent Document 1: Japanese Unexamined Patent Publication No. 2002-150864].

DISCLOSURE OF THE INVENTION

As described above, various problems exist in conventional combination switches, such as lack of space, impairment of durability due to the connection cord being caught between the bottom cover and the cord cover caused by a loosened connection cord, and switch assembly difficulties.

The present invention is directed towards solving these problems, and is characterized mainly in that a cord engagement section is projected on an outer peripheral section of a bottom cover and a connection cord is engaged with an outer peripheral section of the cord engagement section to be disposed along the bottom cover so as to bypass the bottom cover.

A combination switch for a vehicle according to the present invention is characterized in that a cord engagement section is projected on an outer peripheral section of the bottom cover, and the connection cord is engaged to the outer peripheral section of the cord engagement section to be disposed along a peripheral side of the bottom cover. Accordingly the cord cover can be omitted, and a space to assemble other members on the lower face of the bottom cover can be ensured to provide a spacious advantage.

The connection cord is engaged with an outer peripheral section of the cord engagement section to be disposed so as to bypass the cord cover, thereby to restrict the loosening of the connection cord and prevent the connection cord from being sandwiched. As a result, the durability of the connection cord can be improved. There is no need to pay attention to the connection cord on assembly, and, as a result, assembly is easily performed.

The cord engagement section includes a central nail and hookup nails disposed between the central nail and the right and left connector support sections, and the body includes a wall section opposite to an outer peripheral section of the central nail and groove sections located in both sides of the wall section to communicate between an inner side and an outer side of the wall section. Accordingly the connection cord can be securely disposed along the periphery of the bottom cover by the central nail and the hookup nails. And on assembly, both sides of the connection cord are taken out to the wall section of the body by engaging a central section of the connection cord to the body engagement section of the body. Accordingly the bottom cover can be easily mounted to the body without sandwiching the connection cord.

After the bottom cover is mounted, connectors in both ends are supported at the connector support sections by drawing back and pulling both side sections of the connection cord from the groove sections to an inner side of the body by reversing both side sections. Thereby the connection cord can be easily disposed along a periphery of the bottom cover.

In cases where the wall section is formed at the body engagement section to engage the body to the bracket, the groove sections are spaced by an interval in the body engagement section and in both sides of the body engagement section and are formed between a body-positioning projector to be positioned relative to the bracket and a sensor-positioning projector to position a steering angle sensor relative to the body, the wall section and the groove sections can be formed by the existing sections without particularly forming the wall section and the groove sections, thereby to provide easy manufacturing and simple construction.

A tip end of the central nail is formed close to the wall section of the body to form a clearance between the tip end of the central nail and the wall section of the body so as to be smaller than a diameter of the connection cord. Accordingly the central section of the connection cord can be securely held between the central nail and the wall section of the body and the loosening and the catching in of the connection cord can be securely restricted to dispose the connection cord with an easy assembly.

In cases where the connection cord includes a plurality of twisted thin wires, the loosening and the catching in of the connection cord can be securely restricted to dispose the connection cord with an easy assembly.

An assembly method for a combination switch for a vehicle according to the present invention, comprises: a first step of taking out both sides of the connection cord to an outer peripheral side of the body by engaging a central section of the connection cord to the body engagement section of the body; a second step of supporting the central section of the connection cord between the wall section and the cord engagement section by mounting the bottom cover to the body; and a third step of reversing both side sections of the connection cord to draw back both side sections of the connection cord from the groove sections to an inner peripheral side of the body, as well as pulling the connection cord around the outer peripheral side of the cord engagement section to support the connectors in both ends at the connector support sections.

Accordingly when the bottom cover is mounted with the body cord still being held, the connection cord can be pulled out to an outer peripheral side of the body so that the connection cord does not block the bottom cover mounting. After the bottom cover is mounted to the body, the connection cord is pulled back from the groove sections to an inner side of the body by reversing both sides of the connection cord, to easily dispose the connection cord so as to be bypassed.

BEST MODE TO CARRY OUT THE INVENTION

The objects of a spacious advantage, a durability improvement, and an easy assembly by restricting the loosening and the catching in of the connection cord are achieved with a minimum number of components without an increase in size.

Figure 1:
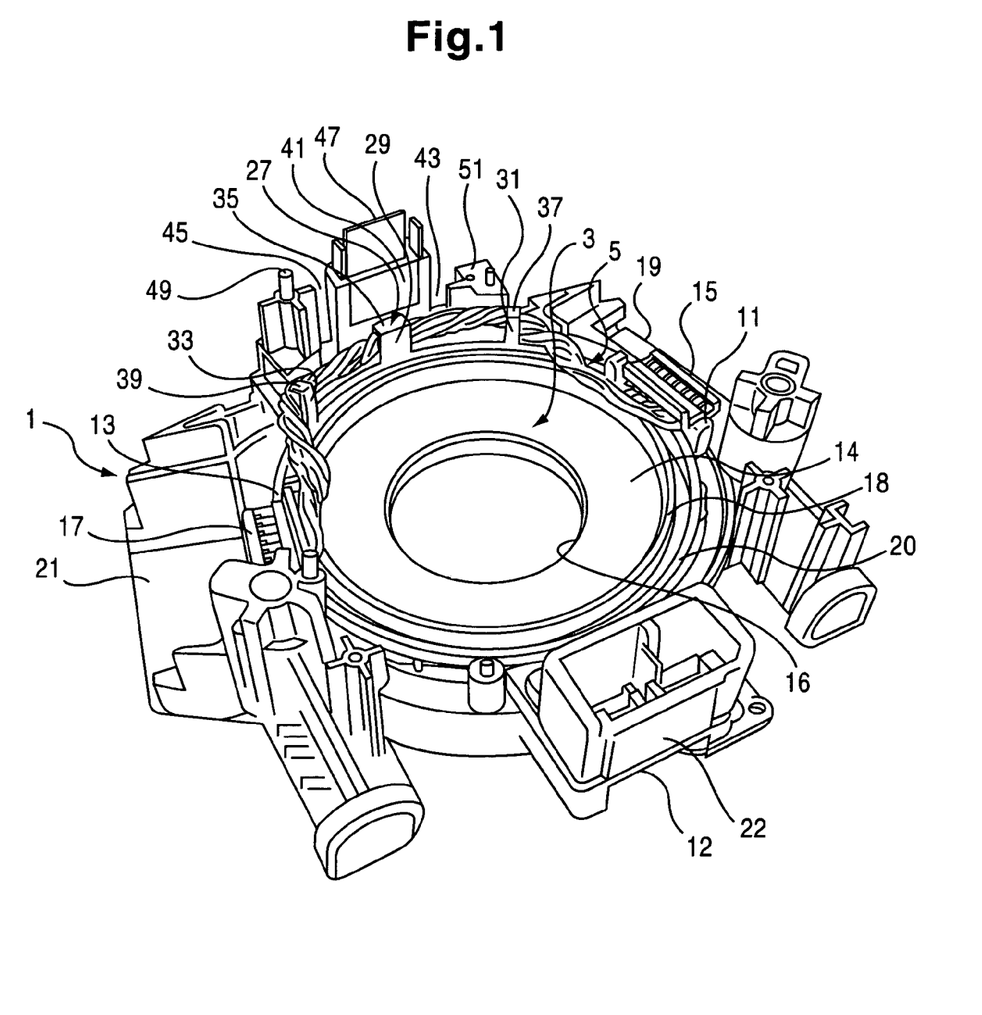
FIG. 1 is a perspective view showing a state where a body, a bottom cover and a connection cord are assembled (Embodiment 1).
Figure 2:
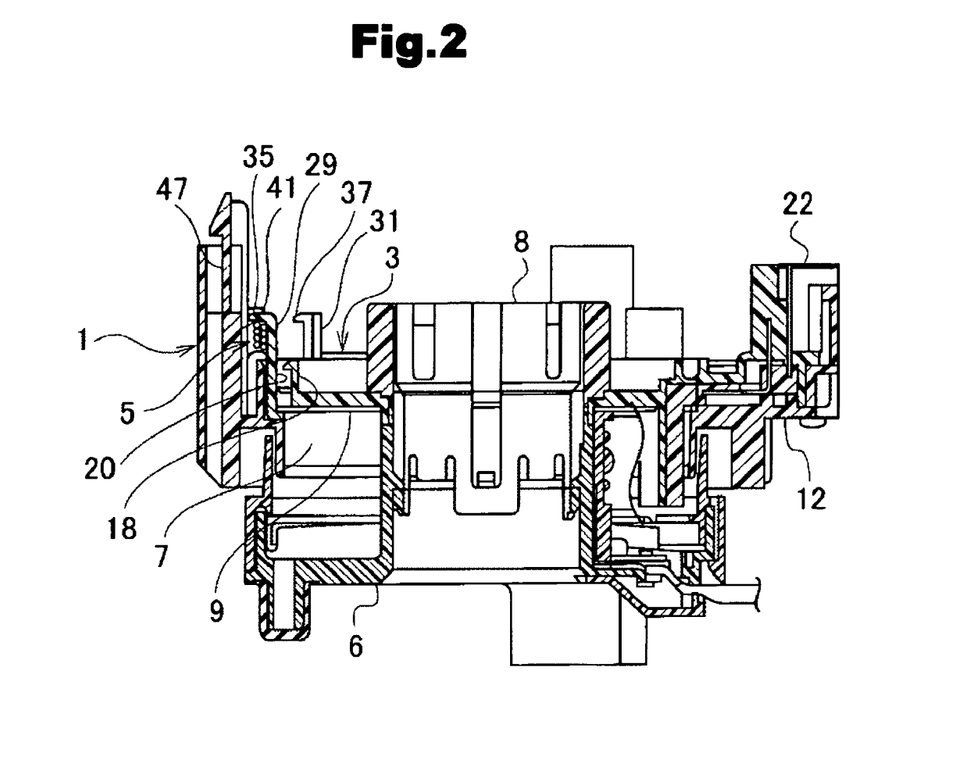
FIG. 2 is a cross sectional view showing-a relation between the body, the bottom cover and the connection cord.
Figure 3:
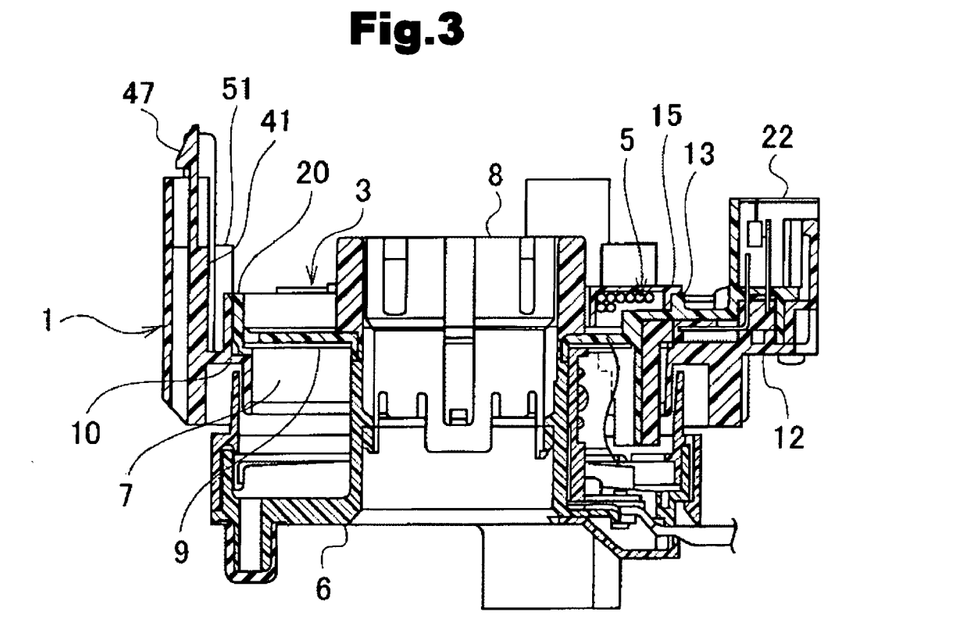
FIG. 3 is a cross sectional view at a position different from FIG. 2 showing the relation between the body, the bottom cover and the connection cord (Embodiment 1).
Figure 4:
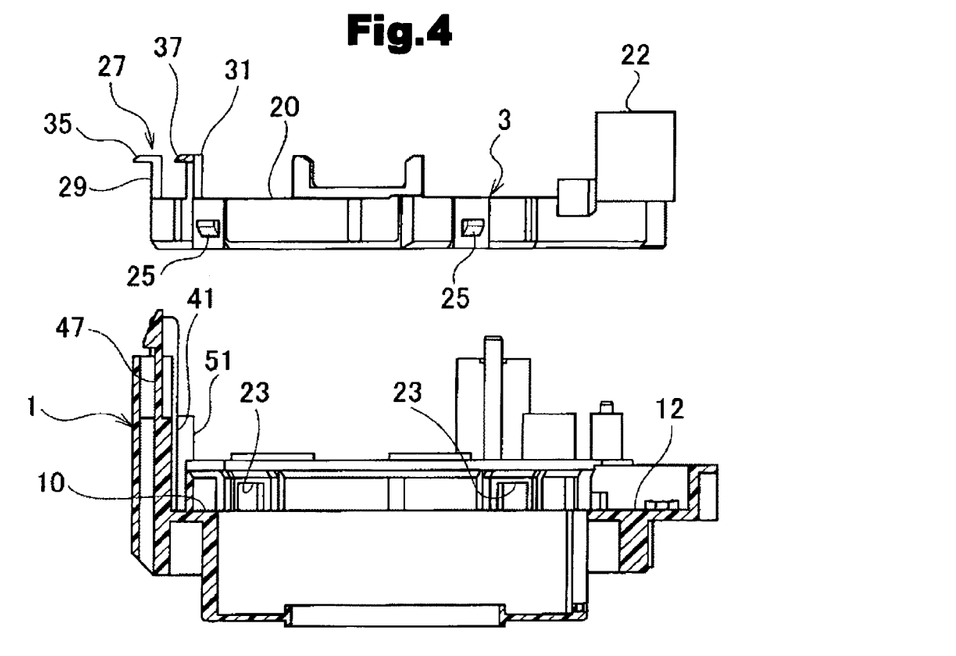
FIG. 4 is a partial cross sectional exploded view showing the relation between the body and the bottom cover (Embodiment 1).
Figure 5:
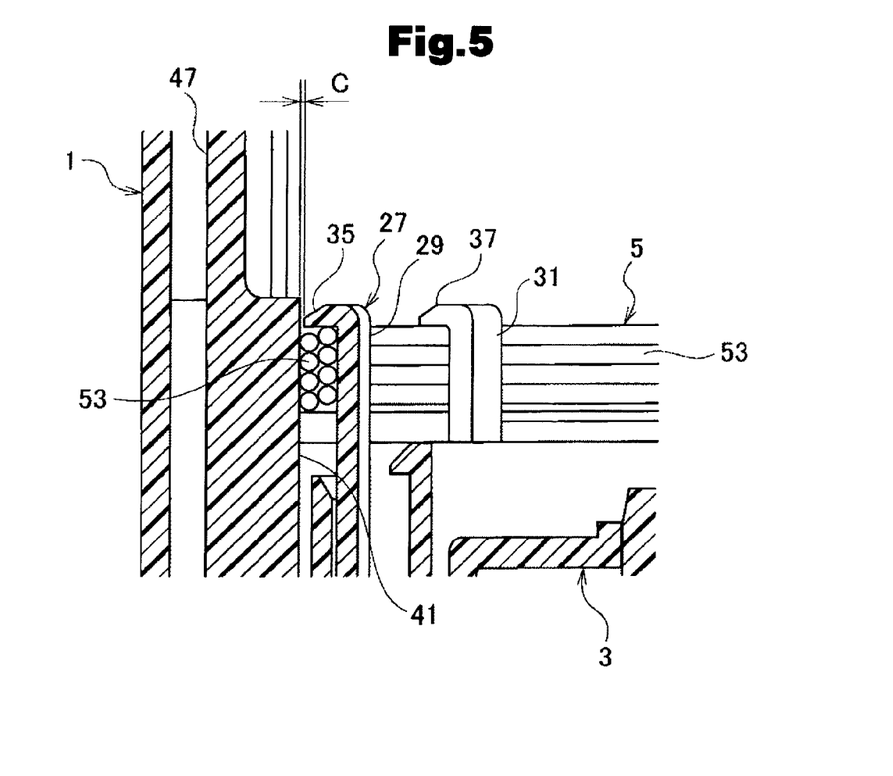
FIG. 5 is a partial cross sectional enlarged explanation view if a key section (Embodiment 1).

FIGS. 1-5 show a key part of a combination switch for a vehicle to which an embodiment of the present invention is applied, FIG. 1 is a perspective view of a mounting state of a body, a bottom cover, and a connection cord, FIG. 2 is a cross sectional view showing a relation between the body and the bottom cover, FIG. 3 is a cross sectional view at a different position of the same, FIG. 4 is an exploded view with a cross section of a part showing a relation between the body and the bottom cover, and FIG. 5 is an enlarged explanation view of a key part with a partial cross section. Further, in FIGS. 1-5, for explanation, the upward and downward relation of the body or the like shows a reverse relation to a mounting state to a vehicle body. For example, an upward side shown in FIG. 1 is a lower side in the mounting state to the vehicle body. And an entire construction of a combination switch for a vehicle is substantially the same as in FIG. 11.

As shown in FIGS. 1-4, the combination switch for the vehicle of the embodiment includes a body 1, a bottom cover 3, and a connection cord 5.

In the combination switch for the vehicle, the bottom cover 3 is detachably mounted to the body 1, and the connection cord 5 is disposed along an outer periphery side of the bottom cover 3. Further, a rotor housing 6 to be disposed in a steering wheel side is rotatably mounted to the body 1 by an attachment 8.

A flat cable for supplying power from the vehicle body side to the steering wheel side is received in a cable-receiving space 7 formed between the body 1 and the bottom cover 3, and is supported to the bottom cover 3 by a sliding sheet 9. It is to be noted that the sliding sheet 9 can be omitted depending on the type of the flat cable.

The body 1 is made of non-conductible resin and is mounted to a bracket of the vehicle body side. Mounting sections 19, 21 are disposed in the body 1 at the right and left sides. A lever switch shown in FIG. 11 as the switch main body is mounted respectively to the mounting sections 19, 21. A step section 10 receiving/supporting the bottom cover 3 is formed in an inner peripheral side of the body 1. A plurality of snap stationary angle windows 23 are disposed spaced by a predetermined interval in an inner circumference of the step 10 of the body 1. A support section 12 continuously formed with the step 10 is mounted in one side to the body 1. A body engagement section 47 engaging the body 1 to the bracket of the vehicle body side is disposed to the body 1 on the opposite side of the support section 12. The body engagement section 47 engages the body 1 to the bracket temporarily. A body-positioning projector 49 and a sensor-positioning projector 51 are spaced in both sides of the body engagement section 47. The body-positioning projector 49 determines a position of the body 1 relative to the bracket, and the sensor-positioning projector 51 determines a position of the steering angle sensor to detect a steering angle of the steering wheel relative to the body 1.

The bottom cover 3 is formed mainly of a doughnut-like plate section 14 made of non-conductible resin and is equipped with a penetrating bore 16 disposed in the inner circumference, enabling mounting the rotor housing 6 and is equipped with double circumferential ribs 18, 20 formed in the periphery. Right and left connector support sections 11,13 are mounted to the bottom lever 3 corresponding to the right and left lever switches. The right and left connector support sections are disposed over the double circumferential ribs 18, 20. A connector section 22 is disposed in an outer peripheral face of the circumferential rib 20.

A plurality of stationary nails 25, for example, 4 stationary nails are disposed on the outer peripheral face of the circumferential rib 20 in the circumferential direction by a predetermined interval. The mounting and the removal of the bottom cover 3 to the body 1 are performed by the stationary nails 25 and the snap stationary angle window 23. Namely the bottom cover 3 is mounted to be inserted into the body 1 and the stationary nails 25 are snap-engaged with the snap stationary angle windows 23, thereby to detachably mount the bottom cover 3 to the body 1.

And in the combination switch for the vehicle, in particular, a cord engagement section 27 is disposed in an outer periphery of the bottom cover 3 and the connection cord 5 is engaged to an outer peripheral section of the cord engagement section 27 to dispose the connection cord 5 along the outer peripheral section of the bottom cover 3 so as to bypass the bottom cover 3.

Namely, the cord engagement section 27 is disposed opposite to the connector section 22 and is constructed of a central nail 29 and hookup nails 31, 33 between the central nail 29 and the right and left connector support sections 11, 13. The central nail and the hookup nails 31, 33 are projected on the circumferential rib 20. The central nail 29 is almost as tall as the hookup nails 31, 33, but the central nail is wider than the hookup nails 31, 33.

In the embodiment, the hookup nails 31, 33 are formed substantially in the center between the central nail 29 and the right and left connector support sections 11, 13. Tip end tongues 35, 37, 39 are disposed at the tip ends in the central nail 29 and the hookup nails 31, 33. The tip end tongues 35, 37, 39 are projected toward the outer periphery side of the bottom cover 3.

A wall section 41 opposite to the outer peripheral side of the central nail 29 and groove sections 43, 45 communicating between an inner and an outer side of the body 1 positioned at both sides of the wall section 41 are disposed in the body 1.

The wall section 41 is constructed of a part of the body engagement section 47 engaging the body with the bracket of the vehicle body side. The groove section 43 is formed between the body engagement section 47 and the sensor-positioning projector 51 and the groove section 45 is formed between the body engagement section 47 and the body-positioning projector 49.

As shown in FIG. 5, in a state where the bottom cover 3 is mounted to the body 1, the tip end of the central nail 29 is formed-close to the wall section 41 of the body 1 to form a clearance between the tip end of the central nail 29 and the wall section 41 of the body 1, the clearance being smaller than a diameter of the connector cord 5. Namely a clearance C between the tip end tongue 35 as the tip end of the central nail 29 and the wall section 41 of the body engagement section 47 is formed to be smaller than a diameter of one thin wire 53 of the connection cord 5.

The connection cord 5 is formed by twisting a plurality of thin wires and is equipped with connector 15, 17 at both ends. The connectors 15, 17 are engaged and supported by the right and left connector support sections 11, 13, and are connected to right and left lever switches. In addition, the connection cord 5 may be not twisted.

An assembly method of the combination switch for the vehicle is performed as shown in FIGS. 6-9.

Figure 6:
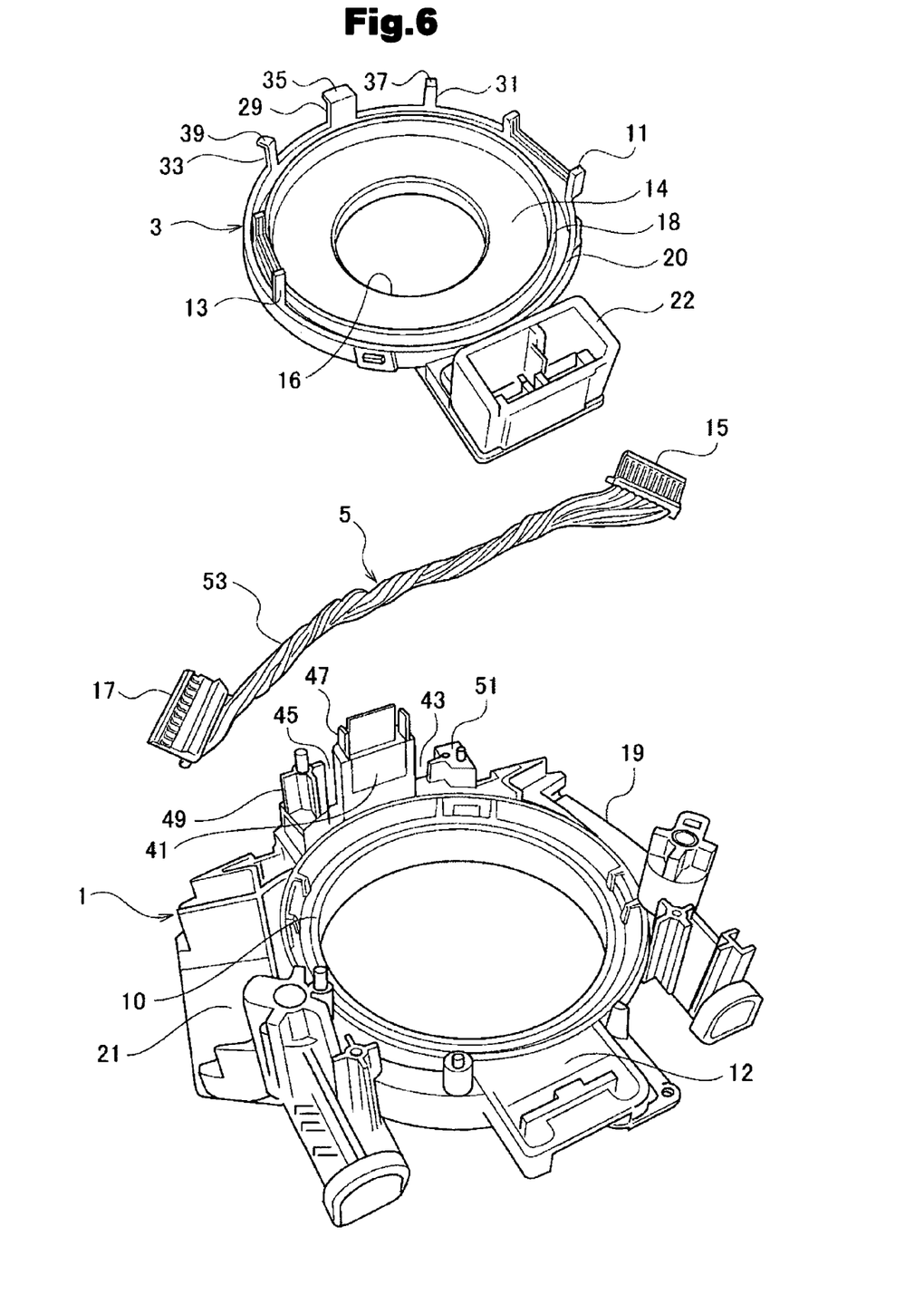
FIG. 6 is an exploded perspective view of the body, the bottom cover, and the connection cord (Embodiment 1).
Figure 7:
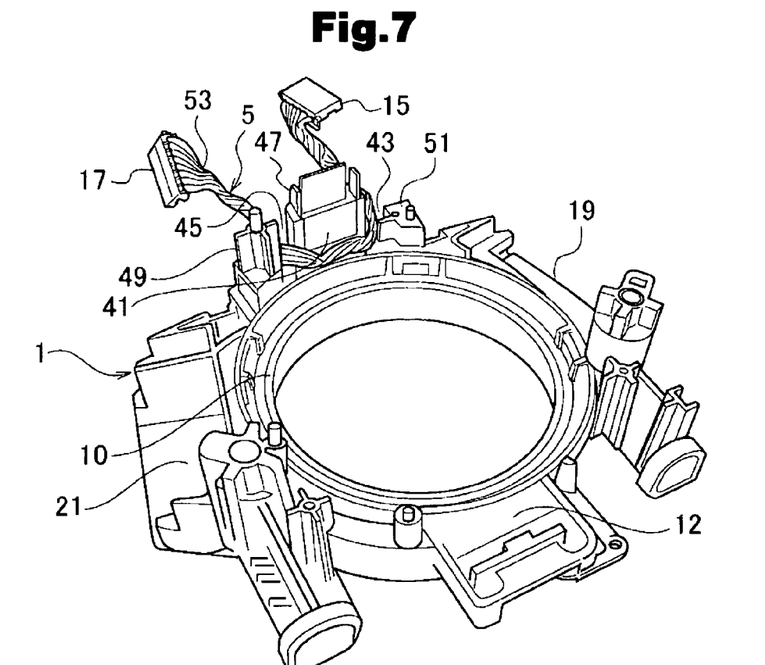
FIG. 7 is a perspective view showing a first step (Embodiment 1).
Figure 8:
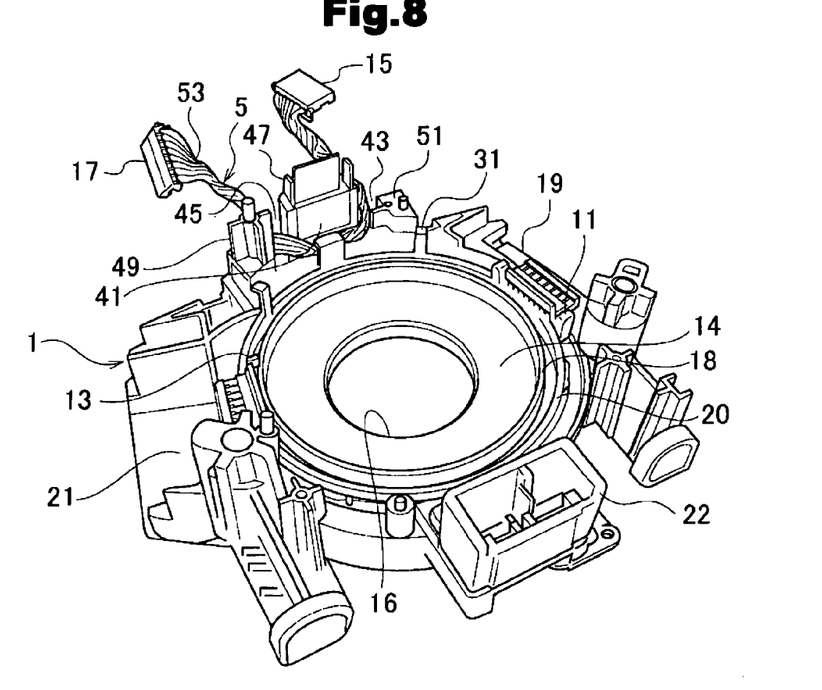
FIG. 8 is a perspective view showing a second step (Embodiment 1).
Figure 9:
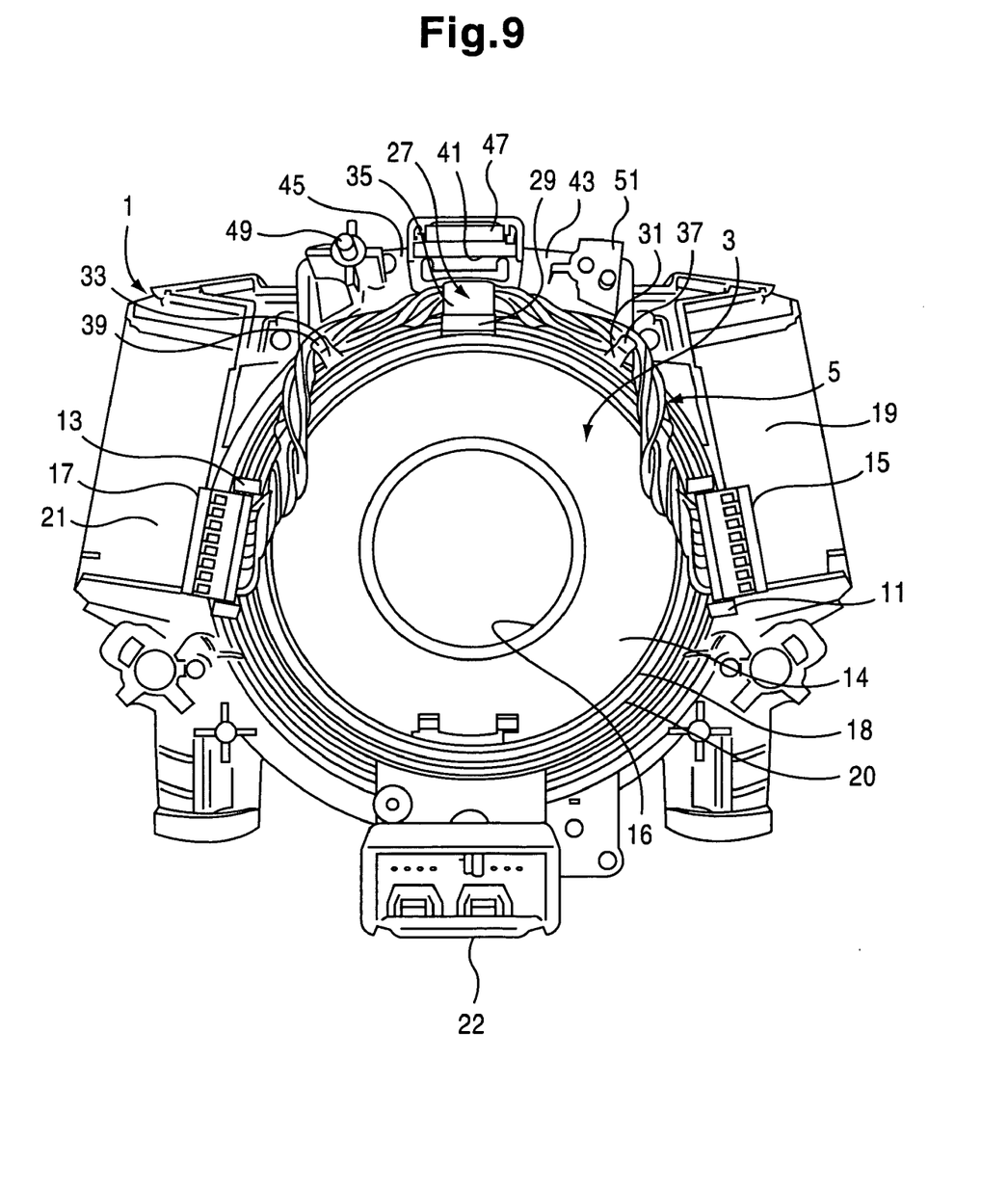
FIG. 9 is a perspective view showing a third step (Embodiment 1).

FIG. 6 is an exploded perspective view of the body and the bottom cover. FIG. 7 is a perspective view showing a first step. FIG. 8 is a perspective view showing a second step. FIG. 9 is a perspective view showing a third step.

As demonstrated in FIG. 6, in a state where the body 1, the bottom cover 3, and the connection cord 5 are not assembled, according to the first step, the central section of the connection cord 5 is hooked by the body engagement section 47 of the body 1 and both sides of the connection cord 5 are pulled out to the outer peripheral side of the body 1 through the groove sections 43, 45 as shown in FIG. 7.

In the second step in FIG. 8, the bottom cover 3 is mounted to the body 1 to support the central section of the connection cord 5 between the wall section 41 and the central nail 29. The fixation of the bottom cover 3 to the body 1 is performed by the stationary nails 25 being snap-engaged with the snap stationary angle window 23 as described above. The connection cord 5 is made of twisted thin wires 53 and restricts the mutual loosening of the thin wires 53.

Accordingly it is easy to perform the withdrawal of the connection cord 5 through the groove sections 43, 45. And the central section of the connection cord 5 can be securely held between the wall section 41 and the central nail 29. In this case, as shown in FIG. 5, the clearance C between the tip end tongue 35 of the central nail 29 and the wall section 41 is formed to be smaller than a diameter of the thin wire 53. Accordingly even if the thin wires 53 are loosened and separated, it prevents the thin wires 53 from tearing loose from the central nail 29 through the clearance C, thereby to securely hold the connection cord 5 between the central nail 29 and the wall section 41.

Even if the wires 53 in the connection cord 5 are untwisted and are easily separated with each other, the clearance C prevents the thin wires 53 from tearing loose form the clearance between the central nail 29 and the wall section 41 thereby to securely hold the connection cords 5 between the central nail 29 and the wall section 41.

According to the third step of FIG. 9, after the second step of FIG. 8, the connectors 15,17 as both sides of the connection cord 5 are reversely rotated to the inner peripheral side of the body 1, and the connection cord 5 is pulled back to the inner peripheral side from the groove sections 43, 45, as well as pulled and rotated to the outer peripheral side of the hookup nails 31, 33 to engage the connectors 15,17 at the both ends to the connector support sections 11,13, whereby the connection cord 5 is securely located around the outer peripheral side of the bottom cover 3 so as to bypass the bottom cover 3.

As described above, the combination switch in the embodiment of the present invention is constructed such that the cord engagement section 27 is projected in the outer peripheral section of the bottom cover 3 and the connection cord 5 is engaged to the outer peripheral section of the cord engagement section 27 to locate the connection cord 5 along the outer peripheral side of the bottom cover 3 so as to bypass the bottom cover 3, which enables omission of a cord cover, as well as ensures spaces for incorporating other members under a lower face of the bottom cover 3 and a spatially advantageous structure.

Engaging the connection cord 5 to the outer peripheral section of the cord engagement section 27 for location prevents the thin wires of the connection cord 5 from being loosened and from being sandwiched, thereby improving durability of the connection cord 5.

Since the loosening of the connection cord 5 is prevented, the assembly is easily performed without attention being paid to the connection cord 5 during assembly.

Since the cord engagement section 27 is formed of the central nail 29 and the hookup nails 31, 33 between the central nail 29, and the right and left connector support sections 11, 13, and the body 1 is provided with the wall section 41 opposite to the outer peripheral side of the central nail 29 and the groove sections 43, 45 located in both sides of the wall section 41 to form communication between an inside and an outside of the body 1, the connection cord 5 can be securely located and bypassed along the outer periphery of the bottom cover 3 by the central nail 29 and the hookup nails 31, 33.

Upon assembly, the central section of the connection cord 5 is hooked on the wall section 41 of the body 1, and both sides of the connection cord 5 are pulled out to the outer peripheral side of the body 1 through the groove sections 43, 45. Thus, the bottom cover 3 can be easily mounted on the body 1 without the connection cord 5 being sandwiched. After the bottom cover 3 is mounted, both sides of the connection cord 5 are turned reversely and pulled back from the groove sections 43, 45 to the inner peripheral side of the body 1 and pulled around the outer peripheral side of the hookup nails 31, 3, and the connectors 15, 17 at both ends are supported by the connector support sections 11, 13. Thus, the connection cord 5 can be easily located and bypassed along the outer peripheral side of the bottom cover 3.

Since the wall section 41 is formed with the body engagement section 47 to engage the body 1 to a bracket of the body side, and the groove sections 43, 45 are formed at both sides of the body engagement section 47 and formed between the body-positioning projector 49 for bracket-positioning and the sensor-positioning projector 51 for the steering angle sensor-positioning which are spaced at both sides of the body engagement section 47, the wall section 41 and the groove sections 43, 45 can be formed at the existing sections without especially forming the wall section 41 and the groove sections 43, 45, which allows an easy manufacture and a simple structure of the combination switch.

A tip section of the central nail 29 is formed close to the wall section 41 of the body 1 and the clearance between the tip section of the central nail 29 and the wall section 41 of the body 1 is formed to be smaller than a diameter of the thin wires 53 of the connection cord 5. Therefore, the central section of the connection cord 5 is securely held between the central nail 29 and the wall section 41 of the body 1, and the loosening and sandwiching of the connection cord 5 can be securely prevented by securely positioning the connection cord 5 so as to bypass the bottom cover 3 and the connection cord 5 can be easily incorporated.

Since the connection cord 5 is formed by twisting a plurality of thin wires 53, the loosening and the catching-in of the connection cord 5 can be more securely prevented, and the secure location of the connection cord 5 is more easily preformed, to be more easily assembled.

Figure 10:
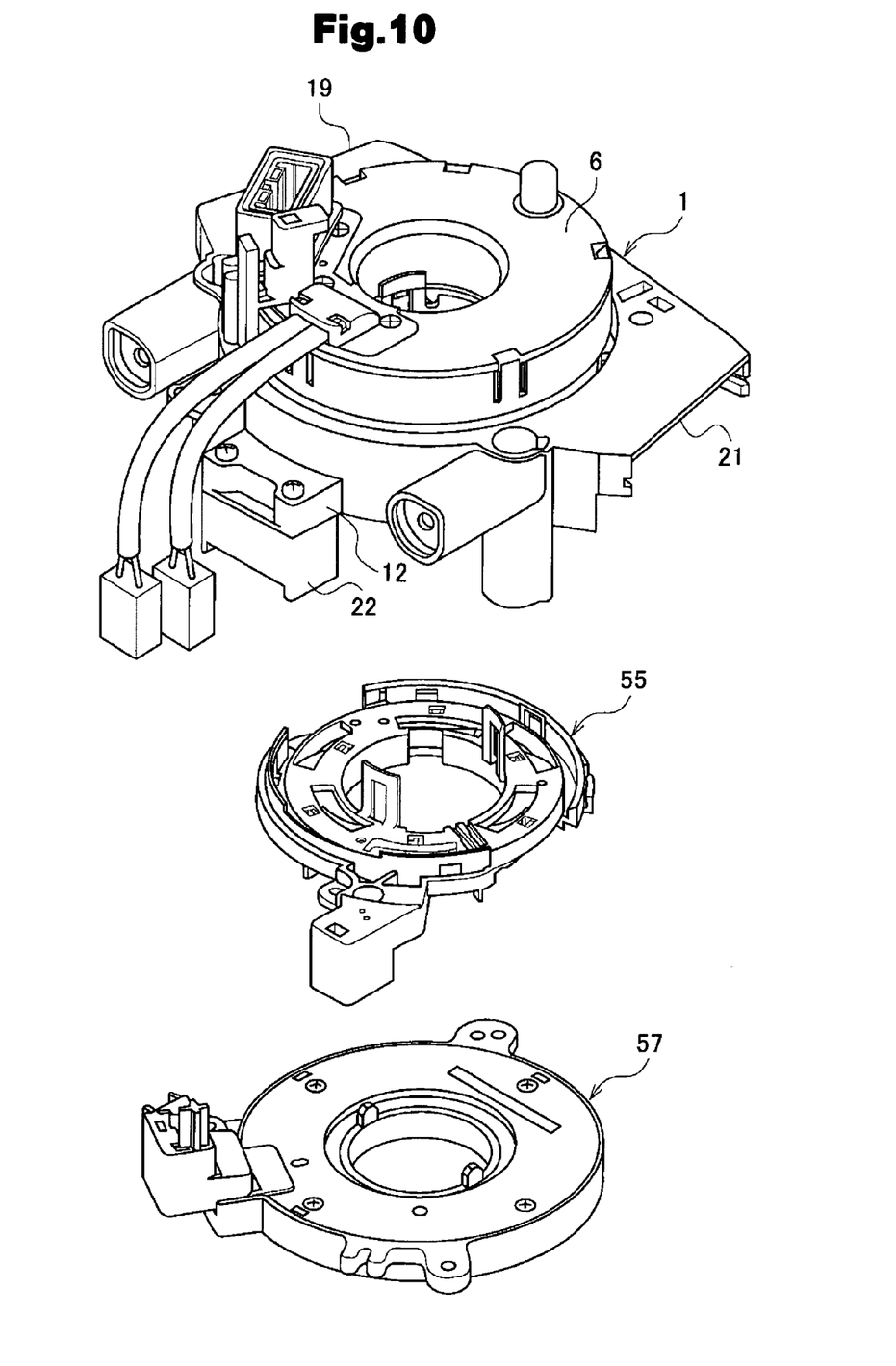
FIG. 10 is an exploded perspective view showing a relation of the body into which the bottom cover and the connection cord are incorporated, the slip ring, and the steering angle sensor (Embodiment 1).

FIG. 10 is an exploded perspective view showing the body in which the bottom cover and the connection cord are incorporated, and a relation between a slip ring and a steering angle sensor. FIG. 10 shows a structure where a slip ring 55 and a steering angle sensor 57 are in order incorporated to the body 1 in which the bottom cover and the connection cord have been incorporated.

As described above, when the connection cord 5 is located in the outer peripheral side of the bottom cover 3, the connection cord 5 does not exist under the lower face to the bottom cover 3 and accordingly the corresponding space becomes available. Accordingly, the slip ring 55 for a handle heater can be easily incorporated at the corresponding space under the lower side of the bottom cover 3. Further, accommodation of the slip ring 55 for a heater in the corresponding space of the bottom cover 3 allows an easy, compact incorporation of the steering angle sensor 57.

It is noted that the cord engagement section 27 may be formed by separately providing the central nail 29 and the hookup nails 31, 33. In addition, the central nail 29 and the hookup nails 31, 33 may be sequentially formed, the cord engagement section 27 may be sequentially formed from the central nail 29 to the right and left connector support sections 11, 13, and the slits may be formed in the connector support sections 11, 13 to pull out the connection cord 5 through the slits to the inner peripheral side.

The clearance C may be formed to be larger than the thin wires 53. In this case it is preferable that the connection cord 5 is twisted. The wall section 41 and the groove sections 43, 45 may be formed with no relation to the body engagement section 47, the body-positioning projector 49, and the sensor-positioning projector 51.

What is claimed:

1. A combination switch, comprising:
a body mounted in a bracket of a vehicle body side, the body including switch main bodies on a right side and a left side of the body;
a bottom cover detachably mounted to the body, the bottom cover supporting a flat cable for supplying power from the vehicle body side to a steering wheel side, as well as including a right and a left connector support section corresponding to the switch main bodies on the right and left side, said bottom cover defining a cable-receiving space in which said flat cable is received;
a rotor housing rotatably mounted to the body, said bottom cover enabling mounting of said rotor housing; and
a connection cord; wherein:
connectors are supported at both ends to the right and left connector support sections and the connectors are connected to the right and left switch main bodies by the connection cord,
a cord engagement section is projected on an outer peripheral section of the bottom cover, and
the connection cord is engaged to an outer peripheral section of the cord engagement section to be disposed along a peripheral side of the bottom cover so as to bypass the bottom cover.

2. The combination switch as defined in claim 1, wherein:
the cord engagement section includes a central nail and hookup nails disposed between the central nail and the connector support sections, and
the body includes a wall section opposite to an outer peripheral side of the central nail and groove sections located in both sides of the wall section to communicate between an inner side and an outer side of the wall section.

3. The combination switch as defined in claim 2, wherein:
the wall section is formed with a body engagement section to engage the body to the bracket, and the groove sections are spaced by an interval in the body engagement section and in both sides of the body engagement section and are formed between a body-positioning projector to be positioned relative to the bracket and a sensor-positioning projector to position a steering angle sensor relative to the body.

4. The combination switch as defined in claim 2 or 3, wherein:

a tip end of the central nail is formed close to the wall section of the body to form a clearance between the front end of the central nail and the wall section of the body, the clearance being smaller than a diameter of the connection cord.

5. The combination switch as defined in claim 4, wherein the connection cord includes a plurality of twisted thin wires.

6. The combination switch as defined in any of claims 1, 2 and 3, wherein the connection cord includes a plurality of twisted thin wires.

7. The combination switch as defined in claim 3, wherein:
a tip end of the central nail is formed close to the wall section of the body to form a clearance between the front end of the central nail and the wall section of the body, the clearance being smaller than a diameter of the connection cord.

8. A combination switch, comprising:
a body mounted in a bracket of a vehicle body side, the body including switch main bodies on a right side and a left side of the body;
a bottom cover detachably mounted to the body, the bottom cover supporting a flat cable for supplying power from the vehicle body side to a steering wheel side, as well as including a right and a left connector support section corresponding to the switch main bodies on the right and left side; and
a connection cord; wherein:
connectors are supported at both ends to the right and left connector support sections and the connectors are connected to the right and left switch main bodies by the connection cord,
a cord engagement section is projected on an outer peripheral section of the bottom cover, and
the connection cord is engaged to an outer peripheral section of the cord engagement section to be disposed along a peripheral side of the bottom cover so as to bypass the bottom cove, wherein:
the cord engagement section includes a central nail and hookup nails disposed between the central nail and the connector support sections, and
the body includes a wall section opposite to an outer peripheral side of the central nail and groove sections located in both sides of the wall section to communicate between an inner side and an outer side of the wall section, and
wherein:
the wall section is formed with a body engagement section to engage the body to the bracket, and the groove sections are spaced by an interval in the body engagement section and in both sides of the body engagement section and are formed between a body-positioning projector to be positioned relative to the bracket and a sensor-positioning projector to position a steering angle sensor relative to the body.

9. The combination switch as defined in any one of claims 8 or 7, wherein the connection cord includes a plurality of twisted thin wires.

10. A combination switch, comprising:
a body mounted in a bracket of a vehicle body side, the body including switch main bodies on a right side and a left side of the body;
a bottom cover detachably mounted to the body, the bottom cover supporting a flat cable for supplying power from the vehicle body side to a steering wheel side, as well as including a right and a left connector support section corresponding to the switch main bodies on the right and left side; and
a connection cord; wherein:
connectors are supported at both ends to the right and left connector support sections and the connectors are connected to the right and left switch main bodies by the connection cord,
a cord engagement section is projected on an outer peripheral section of the bottom cover, and
the connection cord is engaged to an outer peripheral section of the cord engagement section to be disposed along a peripheral side of the bottom cover so as to bypass the bottom cover; and
wherein:
the cord engagement section includes a central nail and hookup nails disposed between the central nail and the connector support sections, and
the body includes a wall section opposite to an outer peripheral side of the central nail and groove sections located in both sides of the wall section to communicate between an inner side and an outer side of the wall section, and
wherein:
a tip end of the central nail is formed close to the wall section of the body to form a clearance between the front end of the central nail and the wall section of the body, the clearance being smaller than a diameter of the connection cord.

11. The combination switch as defined in claim 10, wherein the connection cord includes a plurality of twisted thin wires.

12. A combination switch, comprising:
a body mounted in a bracket of a vehicle body side, the body including switch main bodies on a right side and a left side of the body;
a bottom cover detachably mounted to the body, the bottom cover supporting a flat cable for supplying power from the vehicle body side to a steering wheel side, as well as including a right and a left connector support section corresponding to the switch main bodies on the right and left side; and
a connection cord; wherein:
connectors are supported at both ends to the right and left connector support sections and the connectors are connected to the right and left switch main bodies by the connection cord,
a cord engagement section is projected on an outer peripheral section of the bottom cover, and
the connection cord is engaged to an outer peripheral section of the cord engagement section to be disposed along a peripheral side of the bottom cover so as to bypass the bottom cover,
wherein the connection cord includes a plurality of twisted thin wires.

* * * * *